United States Patent [19]

Wang

[11] 4,193,775

[45] Mar. 18, 1980

[54] METHODS AND APPARATUS FOR SEPARATING GASES WITH VENTILATED BLADES

[76] Inventor: Chia-Gee Wang, P.O. Box 211, Millwood, N.Y. 10546

[21] Appl. No.: 824,515

[22] Filed: Aug. 15, 1977

Related U.S. Application Data

[63] Continuation-in-part of Ser. No. 708,939, Jul. 27, 1976, abandoned.

[51] Int. Cl.² ............................................. B01D 59/20
[52] U.S. Cl. .......................................... 55/17; 55/71
[58] Field of Search ................ 55/16, 17, 71, 158, 55/277; 233/2, 17, 18

[56] References Cited

U.S. PATENT DOCUMENTS

| | | | |
|---|---|---|---|
| 2,422,882 | 6/1947 | Bramley | 55/17 X |
| 2,609,059 | 9/1952 | Benedict | 55/16 |
| 2,892,508 | 6/1959 | Kohman et al. | 55/16 |
| 3,528,217 | 9/1970 | Garrett | 55/277 X |
| 3,613,989 | 10/1971 | Oyama et al. | 55/17 X |
| 3,825,175 | 7/1974 | Sartory | 233/2 |
| 3,902,658 | 9/1975 | Madsen | 233/18 X |
| 3,925,036 | 12/1975 | Shacter | 233/18 X |

FOREIGN PATENT DOCUMENTS 530646 7/1931 Fed. Rep. of Germany ............ 55/17

Primary Examiner—Robert H. Spitzer
Attorney, Agent, or Firm—Fitch, Even & Tabin

[57] ABSTRACT

Turbo-separative methods and apparatus for separation of mixtures of gaseous materials having different molecular weights, particularly gaseous isotope mixtures such as mixtures of $UF_6$, in which differential sedimentation velocities of the components to be separated are established in a laminar boundary layer of the gas adjacent a hydraulically smooth, porous blade surface, and in which a predetermined amount of the boundary layer flow is conducted through the porous surface to stabilize the boundary layer and to provide a higher density gas fraction. The velocity of the gas conducted through the porous blade surface should not exceed the sedimentation velocity of the gas species to be separated.

1 Claim, 3 Drawing Figures

U.S. Patent  Mar. 18, 1980  4,193,775
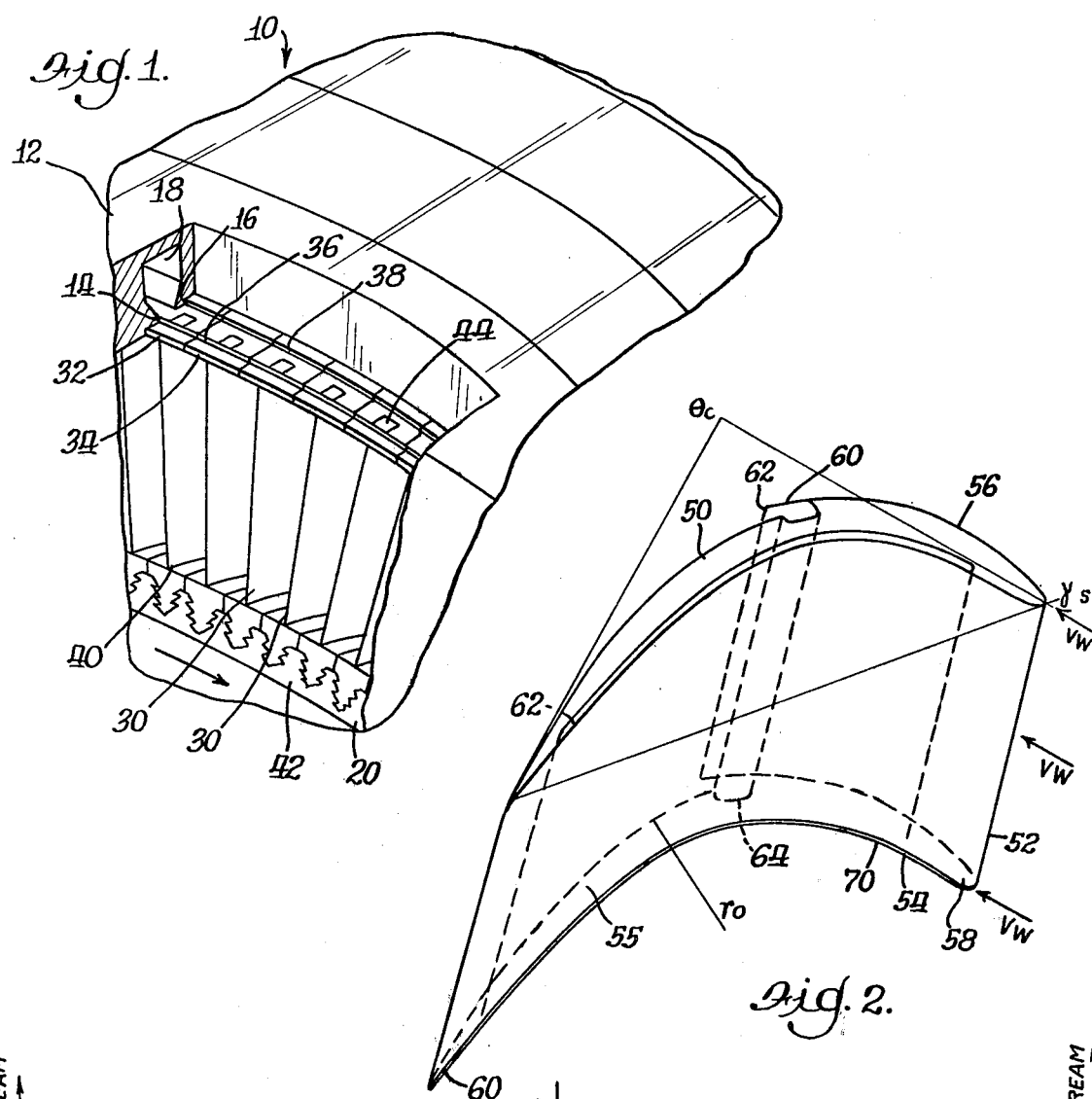
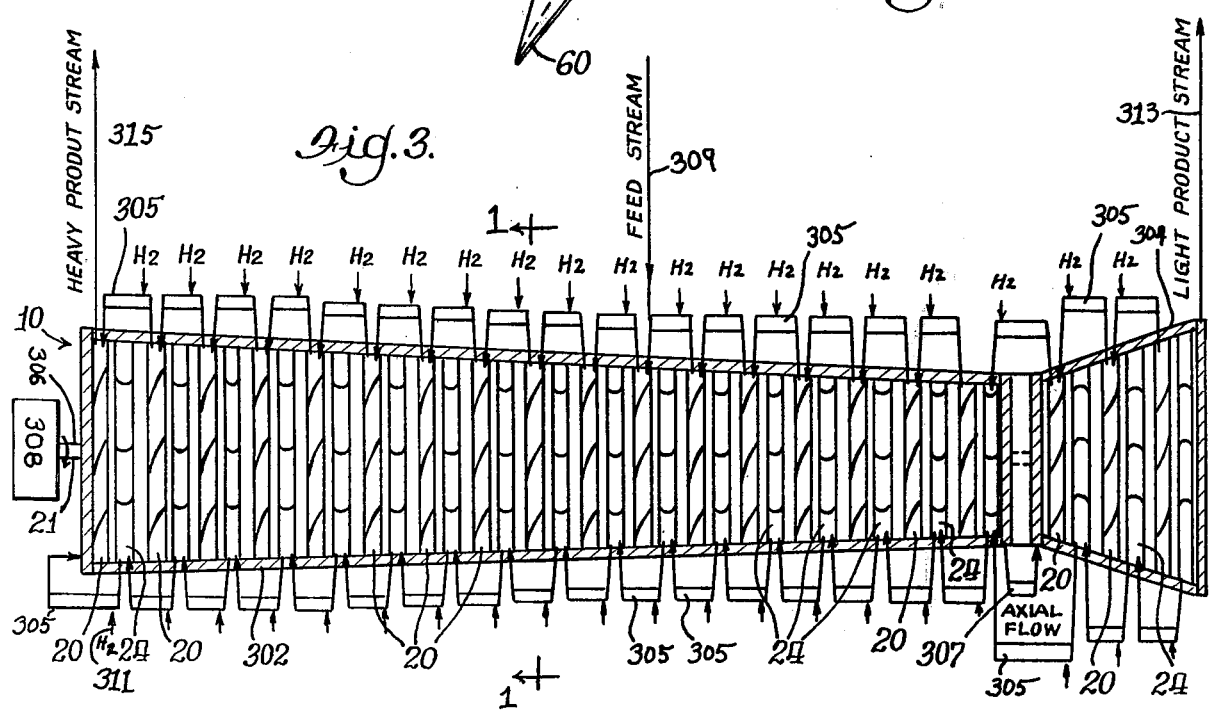

METHODS AND APPARATUS FOR SEPARATING GASES WITH VENTILATED BLADES

This application is a continuation in part of copending application Ser. No. 708,939 filed July 27, 1976 and entitled "Method and Apparatus for Gaseous Separation", which is now abandoned in favor hereof and incorporated by reference herein.

The present invention is directed to mechanical separation of gases, and, more particularly, is directed to turboseparative methods and apparatus for separation of mixtures of gaseous materials, such as gaseous compounds of uranium isotope mixtures, having different molecular weights.

Isotope separation is presently a necessary process for the enrichment of fissionable fuels for most kinds of nuclear fission reactors, but consumes undesirably large amounts of energy and requires enormous capital investment in respect of process equipment and facilities. For example, conventional separation by gaseous diffusion techniques may consume about 2500 kilowatt hours per separative work unit (KWh/SWU) or more, and may require a complex and massive array of facilities with an amortized capital cost of, for example, over $250 per separative work unit per year. This separative energy expenditure represents about 4 MeV in enriching each $U^{235}$ atom for the fuel of nuclear reactors moderated by light water, and is about $4.7 \times 10^7$ times more than its corresponding limit of entropy consideration at ambient temperature.

However, the work of isotope separation has not been done efficiently by conventional separation techniques and apparatus. For example, with reference to the limiting factor of the thermodynamic entropy change in respect of different molecular species, the previously referred to processing energy ratio of 2500 kwh/SWU is more than seven orders of magnitude larger than the energy need for reversing the entropy increment resulting from the mixing at room temperature, of the different atomic weight components of the naturally occurring uranium isotope mixture of $U^{235}F_6$ and $U^{238}F_6$. Accordingly, the potential for substantially improving separative efficiency is high, and substantial research effort, governmental as well as industrial, has been devoted to the improvement of separation systems and techniques. The largest portion of this research effort has been directed to mechanical methods of separation such as those employing gaseous diffusion, centrifugation or curved-jets.

Centrifugal separation techniques have long been known (e.g., U.S. Pat. Nos. 1,337,774 and 1,508,405) and have found utilization in applications such as separating solids from liquids, oxygen from air, and hydrogen from oil refinery gas. Basic techniques for centrifugal separation of gaseous isotopes were developed during the Manhattan Project (e.g., U.S. Pat. No. 2,536,423), with the development of systems utilizing a counter flow produced through application of a thermal gradient, and the provision of multiple, coaxial moving walls, being more recent events (e.g., U.S. Pat. Nos. 2,876,949 and 3,915,673). Such centrifugal separation systems may employ a spinning chamber surrounded by a vacuum, so that a mixture introduced into the center of the rotating chamber along its axis will tend to be separated into its component parts and such that a higher molecular weight (depleted) stream and a lower molecular weight (enriched) stream may be appropriately withdrawn (e.g., at opposite axial ends of the chamber) by the differential effect of centrifugal work performed on components having different molecular weights. For example, in the case of a mixture of two gases having a difference of their molecular weight $\Delta m$ which is introduced along the axis of a spinning chamber, the additional work increment required to move the heavier gas component from the axis to the chamber wall may be represented as follows:

$$\Delta W = \Delta m \Omega^2 \int_0^{r_2} r\, dr = \Delta m \Omega^2 r_2^2/2 = \Delta m\, v^2/2 \tag{1}$$

where $\Delta W$ is the extra work done, $r_2$ is the radial distance of the moving wall of the centrifugal separation apparatus from its axis of rotation the constant angular rotational velocity of the apparatus, and v is $v_w$, the speed of the moving wall ($v_w = \Omega r_2$). However, the differential work increment $\Delta W$ done by the pressure gradient is counterbalanced by degradation due to the thermal diffusion, providing a separative factor $\alpha$ which may be represented as a Boltzmann factor $$\alpha = \exp(-\Delta m v_w^2/2RT) \simeq 1 - \Delta m v_w^2/2RT \tag{2}$$

where R is the gas contant and T the temperature. The effective separation factor $\psi$ may be related to the separative factor $\alpha$, as follows:

$$\psi = \alpha - 1 \simeq -\Delta m v_w^2/2RT \tag{3}$$

The useful work $\delta U$ is generally proportional to both the throughput L and the square of the effective separative factor $\psi$. The useful work may be represented:

$$\delta U = \theta(1-\theta)L\psi^2/2 \tag{4}$$

where $\theta$ is the cut of separation. From these relationships, it is apparent that the useful work $\delta U$ of a gas centrifuge is porportional to the fourth power of the wall speed $v_w$, indicating the desirability of high wall speed, and centrifuges may have values of $v_w$ in excess of about 400 meters per second. Furthermore, the value of $\psi$ can be much enhanced by the provision of an axial counterflow between the enriched and the depleted streams to cause a cascade within the spinning chamber, and a thermal gradient is generally employed in the provision of such a counterflow. Conventional centrifuge techniques can reduce the separative energy requirements of diffusion techniques by an order of mangitude, but at the expense of higher capital and maintenance costs.

However, there are various disadvantages in respect of gas centrifuges. In this connection, the massive moving wall of a gas centrifuge is at the largest radial distance, resulting in a large moment of inertia which can be a dangerous feature in such processing equipment. However, the most serious drawback of conventional gas centrifuge systems are limitations on the rate at which material may be processed by the equipment. Centrifugal separation of the constituent population is pressure diffusion limited, and this factor limits gas centrifuge throughput. The diffusion time necessary to traverse the radial distances used to provide high wall speed (as well as the axial distance which may be about ten times the radial dimension for in situ cascade centrifuge) is relatively long. This constraint severely limits centrifuge throughput. At a typical capacity of about one-half SWU per day, the unit capital cost and maintenance is considerably more expensive than that of gaseous diffusion equipment. Thus, although the unit energy need has been reduced by about an order of magnitude from that of diffusion systems, to less than 300 kwh/SWU, the unit cost of centrifuge production is still close to that of diffusion at about $90 per SWU.

In centrifugal systems, the gases co-rotate with the bowl at very high speed, so that there is little fluid dynamic problem with mixing caused by differential wall-gas velocity interaction. The separative flow is diffusion limited, and for a given periphery speed sustainable by a particular strength of material forming the bowl, the smaller the radius, the larger the centrifugal force to drive the pressure-diffusion. However, the high speeds necessary present certain difficulties. For example, at typical radius of 10 cm with a typical wall-speed of 400 m/s, the bowl is already spinning at 38,000 rpm. This combination of very high periphery speed at relatively low throughput is a key bottleneck which drives up the capital cost. Also the weight of the spinning bowl is mostly concentrated at the wall of maximum radius, which gives rise to a large moment of inertia, and at high speeds, becomes a heavy burden to the rotating shaft to undergo sudden dislocation, such as earthquake or the breaking of a neighbouring bowl. Safety factors can translate quickly into high costs of capital as well as maintenance.

In an effort to provide for increased material throughput, curved-jet systems have been developed in which a jet of the gas mixture to be separated is directed to impinge against a curved wall, causing a centrifugal force in bending the flow of gas (e.g., U.S. Pat. Nos. 2,951,554, 3,362,131, 3,708,964, 3,853,528 and 3,877,892). A portion of the gas stream representing a higher molecular weight cut (head assay) may be substantially diverted by a knife-edge, or "skimmer", from the gas stream immediately adjacent the curved wall representing a higher molecular weight cut ("tail assay") and the resulting head assay and tail assay streams are subjected to subsequent curved-jet separation treatment in a counterflow cascade system to cumulate the incremental separative effect of each curved-jet passage of the gas.

In such curved-jet systems, pressure energy of the gas is converted into curved flow energy with a curved convergent-divergent nozzle, and a carrier fluid with a very low molecular weight is employed to give the high molecular weight gas a high flow velocity. Since the throughput L of equation (4), supra, is also proportional to the flow velocity, $v_f$, and the square of the effective separative factor $\psi$ is proportional to $v_f^4$, the useful separative work $\delta U$ becomes proportional to $v_f^5$. Furthermore, the difference of molecular weight of an isotope mixture also gives rise to a difference of sedimentation time in a low molecular weight carrier fluid. Therefore, in a high centrifugal field, this difference of sedimentation time may be used to obtain a slightly higher separative factor $\psi$ than that of the corresponding equilibrium value of a centrifugal separation.

The diffusion time of curved-jet systems may be optimally selected by providing the curved wall with a predetermined relatively small length in a direction along the gas trajectory, while attempting to provide for system throughput by making the nozzle and wall relatively long in a direction orthogonal to the gas trajectory. However, a major portion of the pumping energy in curved-jet uranium isotope separation is wasted in processing the low molecular weight carrier fluid, and the pumping energy and displaced momentum are generally not recoverable. The separation of the carried fluid also requires some work. In view of these considerations, the overall separative energy requirement for curved-jet systems is even higher than for diffusion systems. In order to partially alleviate this problem, it is possible to combine and carry out the pumping and carrier fluid separation in one rotating chamber to save a fraction of the energy requirement. However, this level of energy consumption per SWU is still undesirably high.

The separative effects of conventional curved-jet separation systems are confined to relatively limited parameters. To minimize heavy gas molecular interaction the flow must be substantially subatmospheric. This flow runs against a stationary curved-wall, and the radius of curvature of the wall must be reduced to a very small value such as about 100 microns. However, due to viscous interactions of the stationary wall, the layer of the flow nearest to the wall has the smallest velocity and therefore the smallest centrifugal force. This negative velocity gradient not only retards the separative effect, but can also cause the molecules away from the wall with higher centrifugal force to replace those nearer to the wall with smaller centrifugal force in accordance with Goertler-Taylor type instability effects. Similar stability problems are generally known in connection with axial turbomachines where the flow of the rotor blades are more stable than that of the stator blades, and such problems may play a role in the limiting number of effective collisions allowed in curved-jet systems. Additionally, in the separation of flows by curved-jet systems, the heavier component is skimmed off next to the wall, and the thicker the layer which is skimmed off to increase throughput, the smaller the separative factor becomes.

There have been various non-mechanical methods under development in recent years to selectively excite and separate the $U^{235}$ isotope, for example by laser excitations and by ion cyclotron resonance. These approaches would attempt to reduce the current unit cost of production by a factor of about one-half to three-quarters, but are still under intense research by various means in various countries. Enrichment service is an important aspect of the nuclear fuel cycle, but the most important cost factor is now the cost of uranium. If a substantially more efficient method of enrichment could be provided, not only the direct enrichment cost could be saved, but also the costs for uranium ore and the chemical conversion could be reduced by a factor corresponding to the additional amount of $U^{235}$ that could economically be stripped from the tail waste. For example, if waste composition could be reduced on a cost effective basis from 0.3% to 0.1%, the uranium reserve is effectively increased by (0.3−0.1)/(0.711−0.3), or about 50% and the vast stockpiles of previously processed tail material could be reprocessed for additional yield.

Accordingly, it is an object of the present invention to provide new methods and apparatus for the separation of gases of different molecular weight. It is a further object to provide such methods and apparatus having improved efficiency and/or throughput characteristics. These and other objects of the invention will become apparent in view of the following detailed description and the accompanying drawings of which FIG. 1 is a perspective view, partially broken away, of an embodiment of turboseparative apparatus in accordance with the present invention;

FIG. 2 is a view of a rotor blade of the apparatus of FIG. 1; and

FIG. 3 is a schematic side view of the apparatus of FIG. 1.

In copending application Ser. No. 708,939, filed July, 1976, separative methods and apparatus are provided which utilize a moving wall cutting into the gases, where the radius of curvature of the gas-interactive wall can be made smaller than that of the bowl of a corresponding centrifuge to increase the force for pressure-diffusion.

In accordance with the present invention, further development of turboseparative apparatus and methods utilizing separative effects provided in a thin laminar boundary layer subjected to a centrifugal field, adjacent a porous, hydrodynamically smooth blade surface.

The boundary layer is in a centrifugal field oriented toward the blade surface and produced by relative motion between the blade surface and the gas mixture to be subjected to separative treatment. The maintenance of substantially laminary boundary layer conditions is important to the effectiveness of the present invention because turbulent mass transport may be several orders of magnitude greater than the separative mass transport of the laminar boundary layer flow. Also in accordance with the present invention, a portion of the laminar boundary layer flow is conducted through the porous hydrodynamically smooth blade surface to provide a separated, high molecular weight fraction, and to stabilize the laminar boundary layer. The requisite laminary boundary layers and centrifugal force may be provided by a series of curved airfoil blades with ventilated surfaces arranged in the manner like that of conventional turbomachinery. Conduction of boundary layer gas through the blades (which may hereinafter be referred to as "suction") at the pressure side of the blade takes away the heavier component preferentially, and provides stability to the laminar boundary layer at that surface. Separative effects may be produced in the thin boundary layer with great efficiency. Blowing (i.e., addition of gas through the blade to the boundary layer, particularly to supply energy to a layer retarded in its flow to prevent pressure build-up and boundary layer separation or turbulence) and suction may be used on the suction side of the blades to provide for stability of the flow and to effect input of gas to the system in a cascade manner. The use of airfoil blades in a turbomechanical configuration makes possible the processing of a large volume of gas, by a relatively small apparatus having a relatively large gas processing surface area per unit volume.

The methods and apparatus of the present invention are particularly adapted for use in the enrichment of uranium compounds in the $U^{235}$ isotope, and in this connection, the gaseous uranium hexafluoride compound is conventionally used for enrichment purposes. However methods, and apparatus in accordance with the invention may also be used in the separation of other isotope mixtures (e.g., radio-isotope separation or enrichment) and in the direct separation of other gaseous mixtures of different molecular weight. When separating uranium isotopes, a substantial molar fraction of the gas mixture should comprise a light gas such as hydrogen or helium, for reasons which will be more fully discussed in connection with the description of the embodiment of apparatus shown in the drawings.

Turning now to the drawings, the present invention will now be more specifically described with respect to the specific embodiment of turboseparative apparatus 10 shown in FIGS. 1-3. The apparatus 10 comprises a compressor section 302 having an adverse pressure gradient in the direction of axial flow and a turbine section 304 having a favorable pressure gradient in the direction of axial flow. In FIG. 1, the apparatus 10 is shown partially broken away to reveal the rotor-stator-casing construction at an intermediate point of the apparatus along line 1—1 of FIG. 3. The apparatus includes a plurality of blade row rotor elements 20 which are suitably mounted on a rotatable driveshaft 21. Alternatingly separating the rotor elements along the axis of the apparatus 10 is a plurality of blade row stator elements 24 (FIG. 3) which are mounted to the casing 12 of the apparatus 10. Heavy gas fractions, which will be referred to hereinafter as "waste streams" or "tail streams" are conducted from the various blade row elements, and are utilized as input or feed streams in cascade manner to other blade row elements as indicated in FIG. 3. The light fraction travels axially along the apparatus 10 in the direction of axial flow. The blade row elements are accordingly an important aspect of the illustrated embodiment. The illustrated rotor element 20 comprises a plurality of hollow blades 30 like those of FIG. 2, which are regularly spaced about the rotor element 20. The entire rotor assembly is radially symmetrical with respect to the rotational axis and is adapted to be rotated in a clockwise direction in respect of the view of the drawing as indicated by the arrow in the illustration of FIG. 1.

The ring shroud 32 formed by the blade tips 34 defines the outer boundary of each of the rotor elements. The tips 34 of the blades 30 are also provided with sealing ridges 36, 38 which engage mating sealing slots 14, 16 in the casing 12 so that the shroud ring 32 forms a rotatable seal with the casing to confine axial passage of the gas in the separation zone to the active blade region between the blade bases 40 and the blade tips 34. The blades 30 are attached at their respective bases 40 to a rotor disc plate 42 by means of a conventional "fir tree" attachment structure.

For reasons which will be discussed in more detail in connection with FIG. 2, each of the blades 30 is hollow, being provided with radial passageways 44 longitudinally of the airfoil cross-section to vent processed gas flow to a diffuser zone 18 of the casing 12 which is provided for each respective rotor element.

Processed tail stream gas which is passed through the porous zones of the blades 30 is conducted from the various diffuser zones of the casing 12, for example, by means of suitable discharge conduits (not shown) for appropriate reintroduction to the system in a cascade manner or as a heavy gas waste stream product discharge, as shown in FIG. 3. Means 305 for controlling the flow in a predetermined manner such as pressure gauges, pumps (if appropriate) and flow meter assemblies in the discharge conduits may be provided for monitoring and controlling the flow through the porous zone of the blades, and for controlling the temperature of the gas. The means 305 are shown as rectangular boxes at both the top and bottom of FIG. 3, but only a few of the boxes are numbered for clarity of the drawing. The feed stream gas comprising the isotopic $UF_6$ mixture to be subjected to separation treatment is introduced at an intermediate stage and the axial light fraction gas is recovered at the downstream end of the turbine section 304, as also shown in FIG. 3.

As indicated, the maintenance and utilization of laminar boundary layer flow adjacent smooth-surfaced, porous surfaces of blade elements of turbomechanical systems is of particular importance in respect of the present invention and will now be described in more detail with respect to FIG. 2, which illustrates the airfoil blade element 50 of one of the blades 30 of the rotor element 20.

In FIG. 2, the velocity of gas approaching the airfoil blade element 50 is shown by $V_w$, the camber angle is shown as $\theta_c$, and the stagger angle is shown as $\gamma_s$. Gas intercepted by the airfoil blade element 50 is separated at the leading stage 52 of the airfoil element to pass over either the concave surface 54 or the convex surface 56. The gas with relative velocity $V_w$ which is directed to the concave surface 54 receives full guidance along the surface and is subjected to a centrifugal field directed toward the surface of the blade by virtue of the curvature of the blade surface 54. It is an advantage of turbomechanical separative systems that the radius of curvature of the blade surface inducing the centrifugal field may be relatively small with respect to the radius of blade rotation and, in this connection, the maximum radius of curvature of the illustrated blade surface 54 may be about 2 cm or less, and preferably about 1.5 cm or less.

The concave surface 54 is provided with a porous hydrodynamically smooth surface zone 55 over the major portion of the concave surface 54 intermediate relatively small solid-surface zones 58,60 at the respective upstream and downstream ends of the airfoil 50. Generally, the centrifugal field produced immediately adjacent the laminar boundary layer by the relative motion of the gas with respect to the blade surface should best be at least about $1 \times 10^5$ g's, and preferably at least about $1 \times 10^6$ g's along the porous suction surface. For purposes of this discussion, the centrifugal field may be represented by $V_w^2/(r_o - \delta)$, where $V_w$ is the relative gas-blade speed and $r_o$ is the radius of curvature of the surface at the point of calculation and $\delta$ is the boundary layer displacement thickness at which the relative velocity of the gas adjacent the wall reaches 99% of the parallel velocity it would have in the absence of drag from the blade (i.e., 0.99 $V_w$). The boundary layer thickness is sufficiently relatively small that it may usually be disregarded in centrifugal field calculation as a practical matter.

The porous surface zone 55 permits the heavier component of gas in the laminar boundary layer adjacent the surface 54 to be conducted to the interior of the blade. A chamber 62 at the interior of the blade adjacent the porous surface zone 54 communicates by means of the passageways 44 through the blade tips 34 to the circumferential collector zone 16 of the casing 12 (FIG. 1).

The porous surface zone 55, as indicated, should be hydrodynamically smooth. Accordingly, the pore or passageway size should best not exceed about 5 times the momentum boundary layer thickness during operation, and preferably should not exceed about 3 times such boundary layer design thickness. However, the pore size should not be so small that selective gaseous diffusion operates to cause selection of lighter $U^{235}$ over heavier $U^{238}$ to the substantial detriment of heavier fraction separation. Hydrodynamically smooth, porous glass surfaces or hydrodynamically smooth porous metal surfaces such as laser-punched and subsequently polished metal sheets, are examples of suitable porous surface materials. In accordance with fluid dynamic principles, surfaces are generally considered to be hydrodynamically smooth if surface irregularities are less than about 5 times the momentum boundary layer thickness $\delta_2$ ($\delta_2 = \frac{1}{2}$ the displacement boundary layer thickness $\delta_1$, defined hereinabove).

The portion of the gas which is directed toward the convex side of the airfoil element is directed along the convex surface 56, and is substantially less stable in respect of the maintenance of boundary layer stability than the portion of the gas which passes over the concave surface 54. In this connection, in accordance with conventional fluid dynamic principles, the boundary layer will generally tend to be thicker on the convex surface 56 with a further tendency, depending on airfoil design and conditions of operation, toward detachment of the boundary layer from the convex surface 56 at a point such as point 60. Any such detachment at the leading or central portion of the airfoil surface causes substantial turbulence and is to be avoided, because even though such turbulence would not substantially affect the boundary layer at concave surface 56, the turbulence is undesirable with respect to performance of downstream blade cascade units.

Accordingly, a means for introducing gas at the surface 56 to prevent boundary layer separation therefrom may be provided, and may further serve as a means to introduce gas mixture to be separated into the apparatus 10 (as will be more fully explained in connection with the description of FIG. 3). In this regard, a radially longitudinal slot 62 is provided along the surface at a point of possible separation, and which is in communication with a longitudinal channel 64 in the blade element 50. At its radially proximate end, the channel 64 is in communication, through an appropriate passageway in the "fir tree" coupling at the base 40, with a gas supply manifold in the disk plate 42 for the blade cascade array 14. Accordingly, a feed stream supplied through the rotor axis to the disk 14 will be discharged in the direction of gas flow with respect to the surface 56. Such discharge in proper amount will provide an improved pressure gradient in a direction along the flow direction and will thus act to "cement" the boundary layer to enhance stability and minimize turbulence in the system.

Downstream of slot 62, or in lieu thereof, a further blade suction zone may be desired to make sure there is no detachment of the boundary layer even with the negative Richardson number.

In connection with the design of the blades and blade rows, it should be noted that the illustrated blade is relatively thin (small lift) with a relatively large camber angle $\theta_c$, and that in general the aerodynamic design is intended to maximize the centrifugal field at the concave blade surfaces, consistent with maintaining laminar boundary layer conditions and minimizing turbulence. Too great a rate of change of the duct profile of the rotor and stator cascades, or too great a curvature of the blades as a whole has an effect similar to decelerating the flow in a duct, and the consequent adverse pressure gradient would cause separation of the boundary layer. In general, the amount of energy transfer and the level of efficiency are functions of the camber angle $\theta_c$, the angle between the axial direction and the chord line; or the stagger angle $\gamma_s$, and the blade speed $V_w$. For the purpose of separation of the gases, a large camber angle and high blade speed are desirable, but design compromise may readily be made in the change of the duct profile and stagger angle parameters. In terms of efficiency of a compressor, such compromises make the pressure enhancement per stage rather poor, and effective units may desirably have a moderate pressure ratio of about 1.2 or less for adjacent rotor-stator pairs. For turbine blade and cascade design, the pressure gradient is more favorable with respect to conditions for laminar boundary layer stability, the camber line angle $\theta_c$ can be made well over 90° even without suction, and there may not be a substantial tendency toward boundary layer separation on the convex surface.

Turbine rotor and stator cascades may be designed to function in a similar manner. The degree of reaction between the rotors and the stators may be approximately equal or otherwise shared so that the pressure side of both the rotors and stators may be fully utilized. The sharing of reaction implies a similarity of profile between rotor and stator airfoil design.

Because high velocity $V_w$ of the blades with respect to the gas is desired, while obtaining effective treatment of gas by each cascade, or blade row stage, the compressor or turbine design may be adapted to provide for relatively high ratios of blade speed to axial gas speed, along the axis of the apparatus. In this connection, the ratio of the average relative velocity of the gas $V_w$ with respect to the rotor blades to the average axial gas velocity should best be at least about 2 and preferably about 3 or more.

In combination with other aspects, the processing of the gas in a laminar boundary layer in a centrifugal field is an important feature of the present invention, which will now be described in substantial detail.

Prandtl in 1904 introduced the concept of the boundary layer to deal with laminar flow at high Reynolds number, so that the flow can be approximated accurately by dividing it into a nonviscous region which is under inertial force only, and the boundary layer region which contains all the viscous forces. Since then, the boundary layer theory has been the cornerstone of fluid dynamics, such as presented in a classical work entitled "Boundary-Layer Theory", by Hermann Schlicting, McGraw-Hill Book Company, 6th Ed., 1968, which is hereby incorporated by reference.

At the concave surface 56, the laminar boundary layer 70 at the porous zone 55 is much smaller than the radius of curvature of the surface with which the layer is attached (e.g., less than $1 \times 10^{-2}$ of the radius of curvature), so that the layer may be well represented by a flat surface for purposes of the following discussion. Considering such a flat porous surface having uniform suction applied across the surface, the velocity profile of the flow $V_b$ of the boundary layer can be represented from the Navier-Stokes equation, as follows:

$$V_b = V_o e^{-y/\delta_1} \quad (5)$$

where $V_o$ is the flow velocity relative of the porous wall, y is the distance from the wall and $\delta_1$ is the displacement thickness in accordance with conventional fluid dynamics rotation for the gross composition of the gas. The displacement thickness $\delta_1$ may be represented as follows:

$$\delta_1 = \mu/\rho u_s \quad (6)$$

where $\mu$ is the viscosity, $\rho$ is the density, and $u_s$ is the effective suction velocity at the porous surface 55 resulting from the passage or conducting of gas through the porous surface. This suction velocity has a vector direction orthogonal to the surface. The sheering stress $\tau_w$ at the wall is very small for the laminar boundary layer and may be represented as follows:

$$\tau_w = \mu(\partial V_b/\partial y)_w = \rho u_s V_o \quad (7)$$

Now, introducing the factors of the curvature of the porous wall 55 and the centrifugal field which provides a centrifugal pressure at the concave side of the airfoil surface, it will be appreciated that there will be a pressure gradient normal to the wall. The pressure gradient dP/dy normal to the wall for an isentropic flow may be represented as follows:

$$dP/dy = \rho V_b^2/r_o = \rho_o(P/P_o)^\gamma V_b^2/r_o \quad (8)$$

where $\rho_o$, $P_o$ are respectively the ambient ("initial") density and pressure away from the wall, $\gamma$ is the ratio of specific heats of the gaseous mixture, and $r_o$ is the radius of curvature of the wall. The pressure gradient can be integrated, assuming no concentration stratification as a first approximation, to give a density stratification, which in turn gives rise to a sediment velocity $u_o$, which may be represented as follows:

$$u_o(y) = D_{12}\{-dC_1/C_1 dy + (\Delta M/\overline{M})C_2 dP/Pdy \{ \quad (9)$$

where $D_{12}$ is the binary diffusion coefficient of a light gas-heavy gas mixture (such as $H_2$-$UF_6$), and is inversely proportional to the pressure P, $C_1$ is the molar fraction for the sedimentation, and $C_2$ is the molar fraction for the buoyant component, $\Delta M$ is the mass difference between the two components, and $\overline{M}$ the mean weight of the gas mixture. The concentration gradient in Equation 9 counteracts the effect of the pressure diffusion, and at equilibrium will result in zero sediment velocity if the processed fraction immediately adjacent the wall surface, which has passed through the boundary layer, is not removed. The concentration stratification obtained from Equation 9 can be used as a density input for Equation 8, and these two equations can be iterated for a consistent result taking the concentration stratification factor into account. The thermal velocity of $UF_6$ molecules is only about 100 m/s at ambient temperature and in order to process the fluid at a high subsonic speed and with a high sediment velocity, lubricant gas of very light molecular weight such as $H_2$ or He gas is used to occupy a major portion of the fluid. Due to the extreme difference of weight between the lubricant and the seeds, the latter can enounter many collisions with the former without losing their memory of momentum. Within a very thin region of the boundary layer, the introduction of lubricant gas changes the transport characteristics completely; not only the density of the fluid stratifies very quickly over a short distance, but also free molecular flow of the seed may be caused to replace the diffusive processes. For $UF_6$ as a seed gas mixed with a light carrier fluid such as helium or hydrogen, the difference in molecular weights between the uranium species and the carrier gas species is approximately equal to the mass of the uranium gas species (i.e., $\Delta m \sim m_{UF_6}$). For mixtures of uranium gases with light carrier gases where the molar ratio of light carrier gas to heavy seed gas is relatively high (e.g., greater than 20:1 and preferably greater than about 30:1 or 40:1 and more preferably greater than about 50:1), the mean molecular weight may be only several times that of the carrier gas ($\bar{m} \simeq$ few $m_{He}$). This results in a very large $u_o$ for the seed gas making the carrier fluid act like a "lubricant gas" as well as an ingredient to drastically reduce the Mach number of the flow at high speed.

A difference in the isotropic molecular weight of the $UF_6$ gas also produces a difference in the respective sedimentation velocities $u_o$ of Equation 9 for the different isotropic species ($\Delta u_o = u_o^{238}$ minus $u_o^{235}$) which is utilized to provide effective separation at high throughput. The differential transport properties may be further understood by comparison with conventional separative techniques.

For a centrifuge without counter current cascade, the separative process is a result of two competing functions balancing each other dynamically. The centrifugal pressure diffusion drives heavier components towards the wall while the molecular thermal conditions act to diffuse the high concentration at the wall. At equilibrium, the separative constant $\alpha$ simply settles to the Boltzmann factor, exp ($\Delta M\ V^2/2\ R\ T$). The speed of arriving at the equilibrium is shown by the diffusion coefficient, which is an averaged quantity for the non-ordered, collisional transport phenomena. Equations 8 and 9 describe the situation well for the parameters of an ideal gas under isothermal conditions instead of using an isentropic flow (i.e., let $\gamma$ equal one).

Free molecular flow, on the other hand, is an ordered transport phenomena without collision and not under equilibrium balance of pressure and thermal diffusion factors.

From a convergent-divergent nozzle expansion in a curved-jet system, a transition from a continuum flow to an almost free-molecule flow is believed to occur. The average energy due to random motions perpendicular to the stream-lines is continuously decreasing and is being fed into the mean motion of the gas as well as into the random motions parallel to the stream-lines. Since random motion is connected with temperature, this circumstance may be considered as "freezing" of the perpendicular temperature in respect of the wall. For a curved flow with light carrier gas, light gas tends to migrate across stream-lines towards a smaller radius, to motion by the heavier seed gas towards the wall. Many collisions will occur during this stratification of densities, but since the trajectories of the heavy particles are not greatly affected by a single collision with a light gas molecule, the effective number of collisions of the heavy molecules is very small. In other words, the number of collisions must be scaled by a persistance-of-velocity factor, which is of the order of the mass ratio between the heavy and the light. Therefore, the density can be stratified during a centrifugal bending almost without "collision" if the Knudsen number, which is defined as the mean-free-path divided by the dimension of the flow, is maintained at a value higher than the inverse of the persistence-of-velocity factor. If one calls the velocity of the heavy molecule seeds moving towards the wall also the sediment velocity, then seed gases with different molecular weights would have different sediment velocities. If the heavy seed molecules are collected, such as by a skimmer downstream after the seeds are allowed to travel along the concave wall for a particular duration such that the heavier component of the seeds has become positioned between the wall and the skimmer while the lighter component is still above the skimmer, the skimmer would carve out preferentially the heavier component. It will be appreciated that the separative factor in such a process depends on the distribution of the sediment velocities as well as the manner in which the collection is performed. If the distribution of the sediment velocities is so narrow that there is no overlapping between the two components of the seeds, and if the skimmer is positioned exactly in between the two velocity strata, the separation can be complete and total. In general, however, the two velocity distributions overlap a great deal, and the thickness of the skimmer is a substantial fraction of the total thickness of the curved layer of seed fluid.

There are some inherent difficulties in the curved-jet separation technique. For example, a flow which is directed against a stationary curved wall at very high Reynolds number tends not to be stable. In order to obtain a stable laminar flow, the density of the fluid must be reduced to a level that the thickness of the boundary layer is of the order of the length of the wall itself. The number of collisions is indeed reduced in this manner, but a reduced fluid density results in a correspondingly reduced throughput. The velocity profile of curved jet methods poses another problem. By running a flow against a stationary wall, the molecules next to the wall are not subjected to any centrifugal force. Accordingly, there is no separative process immediately next to the wall, yet the curved-jet skimmer can only carve out an optimal separative factor from the flow at a position next to the wall. Thus, the value of the separative factor of 0.04 to 0.05 obtained by the curved-jet experiments at a small cut of the seed gases may be considered to be a diluted mixture of components differentially separated in the flow, together with components along the wall. Further understanding may be obtained from consideration of the stream-lines of the flow of the curved-jet system. While acceleration of the flow implies a stretching of the stream lines, deceleration of the flow implies a contraction of the stream lines, an expansion of the spacing between the lines, or simply, an increase of the perpendicular temperature. If the sediment velocity distribution can be considered as a "sediment temperature", and if this temperature is scaled by the perpendicular temperature, then the viscous interaction with a stationary wall may be considered to decelerate the flow and increase the sediment temperature. If the differential sedimentations remain unchanged for the different isotropic high molecular weight seed gases, an increase of the sediment temperatures has the effect of making the distribution functions overlap more, and therefore causes a reduction of the separable populations.

For a fluid to interact with a relatively moving curved wall, such as the surface of an airfoil blade 50, the fluid accelerates and the stream-line structure of the laminar boundary layer is stretched greatly, reducing the perpendicular temperature of the flow as well as the effective sediment temperature of the light gas-heavy gas mixture. A thin layer at a low perpendicular temperature implies fewer collisions for the seed gases, faster transport across the layer, as well as higher separative effect. With suction of the gas adjacent the wall to the interior of the blade, the boundary layer is further reduced in thickness. Without the use of a skimmer to separate the flow, the position of the porous surface for suction can be placed at the optimal location for the highest separative factor undiluted by the undesired portions of the flow. The resulting separative factor may be optimized to a value at least as good as that of curved-jet systems or about one-half of the equilibrium value of a centrifuge without cascade.

With a disparate mass mixture such as a mixture of $H_2$ and $UF_6$, the collisional changes of momentum, energy or mass concentration, which are usually considered by a diffusion coefficient, should be scaled by a "persistence of velocity" factor as previously discussed. A persistence of velocity factor $\bar{w}_{12}$ may be defined as:

$$\bar{w}_{12} = (\tfrac{1}{2})\mu_1 + (\tfrac{1}{2})\mu_1^2 \mu_2^{-\tfrac{1}{2}} \ln[(\mu_2^{\tfrac{1}{2}}+1)/\mu_1^{\tfrac{1}{2}}]$$

where the reduced masses $\mu_1 = m_1/(m_1+m_2)$ and $\mu_2 = m_2/(m_1+m_2)$; and where $\bar{w}_{12}$ is of the order of the mass ratio $m_2/m_1$, where $m_1$ is the mass of the low molecular weight component, and $m_2$ is the mass of the high molecular weight component. Average mass of the $UF_6$ mixture may be used.

Therefore, over a boundary layer thickness, while the $H_2$ molecules suffer many "most effective" collisions (each of which causes loss of all past momentum memory), the $UF_6$ molecules are not substantially affected by collisions with individual $H_2$ molecules and may "fall" through as if not at all scattered. Thus, $UF_6$ molecules may statistically suffer, on passing through the boundary layer, on the order of "one effective collision" or less, and can therefore be considered as "free fall". $U^{235}F_6$ and $U^{238}F_6$ "fall" slightly differently, and thereby provide a separation mechanism.

Accordingly, it will be appreciated from the preceding discussion that free molecular flow under strong value of the separative factor than that of the diffusive collisions. Without suction through the blade surface, the heavy seed gases will tend to accumulate at the bottom and arrive at a diffusive equilibrium, but with sufficient suction velocity, the effective number of collisions for the heavy seed gas in respect of processing transmit through the boundary layer-centrifugal field may be maintained at a low level, at the order of unity, or less. In the limit of a free molecular flow, the separative factor depends entirely on the distribution function of the sediment velocities. If the distribution is very narrow, a slight difference in the mean sediment velocities of the two seed gases will give very large separation of populatiion, but if the distributions overlap a great deal in the molecular flow and separation configuration, little or no separation will result. However, the effective utilization of such sedimentation function conditions requires laminar boundary layer conditions, and high throughput requires a high processing area. As indicated one feature of the utilization of a turbomechanical system in accordance with the present invention is the large volume of gas which may be rapidly processed by the large airfoil surface of a relatively small machine. Another advantage is the stability criteria of an airfoil blade, particularly in respect to the laminar boundary layer attached to the concave wall of a suction ventilated surface with density stratification loading down the laminary layer.

Flow around airfoil blades in a row, or cascade, is different from flow around isolated airfoils, because adjacent blades form a flow channel which controls the flow in a manner resembling that of a duct. Duct flow in conventional gas turbomachines is almost always turbulent, except for the boundary layer near the walls. Near the walls, the fluid has a much lower velocity relative to the surface, and is normally regarded to have zero velocity immediately at the surface. Without suction, the boundary layer will generally be laminar at least for a short distance downstream from the leading edge of the blade. However, as the layer grows thicker downstream, it tends to become unstable and may eventually detach from the surface, giving rise to a mass transport dominated by turbulent mixing. However, with proper utilization of suction, the laminar boundary layer may be maintained stable, even under moderately adverse pressure gradients. This is particularly so on the concave side of the wall where the centrifugal force helps to push the fluid against the wall to prevent it from detachment. Suction effects can drastically reduce the thickness of the boundary layer, and change its velocity profile as indicated in Equation (5) to make it "fuller" and therefore more stable. Physically, suction simply removes some static pressure energy which might otherwise be available for turbulence and forces the fluid to receive full guidance from the surface. When the effective suction velocity $u_s$ immediately at the surface is greater than a value of about $1.18 \times 10^{-4}$ of the relative velocity $V_w$ between the gas and the airfoil surface, the boundary layer becomes stable for all Reynolds numbers without pressure gradient (Schlichting, supra). Fortunately, the sedimentation velocity $u_o$ of Equation 9 under suitable conditions may be made to substantially exceed the effective stability suction velocity $u_s$ (e.g., by more than an order of magnitude with a pressure P of one atmosphere for a gas mixture of 98 mole percent $H_2$, 2 mole percent $UF_6$).

The use of a substantial fraction of a very light carrier gas as a lubricant also has vital effects on the stability. The obvious effect is to decrease the Mach number for a given relative gas speed $V_w$. For example, the mean fluid density of a two mole percent mixture of $UF_6$ in $H_2$ is about one-third of that air at the same pressure, making the flow subsonic, even if the blade speed is pushed to the limiting values of metallic, glass and/or glass or other fiber materials used in the blades. Desirably, the rotor blade speed will be at least about 300 meters per second. Moreover, when the fluid interacts with the blades and stratifies in density next to the blade surfaces, the sonic velocity of the dense mixture is greatly reduced, but this portion of the fluid co-moves with the surface as part of the boundary layer, so that the relative speed may still be maintained subsonic. In a subsonic flow, the usual expansion and compression waves at high Mach number which often trouble the design of turbomachinery may be avoided, although it is not impossible to design a separative process in a supersonic flow. Another stability enhancing effect is the loading down of the boundary layer on the concave pressure side of the blade surfaces with high density fluid. In order for the flow to become turbulent, a greater supply of energy is required to alter such a state of laminar stratification. This can be shown as a Richardson number, and again in the present case, the value may be made stable without pressure gradient for all Reynolds numbers independent of suction (Schlichting, supra). Strong centrifugal force on the concave wall is another stabilizing condition. If one adds all the three stabilizing elements, namely the suction, density stratification, and centrifugal pressing, the pressure side may be made capable of handling a substantially adverse pressure gradient while remaining laminarily stable.

From the preceding discussion, it will be appreciated that the separative effects in the thin laminar boundary layer may be utilized to substantial advantage in high throughput isotope separation.

By providing a suitable combination of processing conditions, the differential sedimentation tendencies through the thin boundary layer may be used without destructive intermolecular UF$_6$ interaction. In this connection, the mean sedimentation time of the UF$_6$ species to pass through the boundary layer should best be less than the mean time between collisions of UF$_6$ molecules in passing through the boundary layer. As indicated, such conditions may be accomplished by maintaining a low partial pressure of UF$_6$ in the gas mixture (by using a lubricant gas and/or by operation at low pressure), by maintaining a laminar boundary layer of suitable "thinness", and by providing a suitable centrifugal field adjacent the boundary layer.

In a duct flow, stability of one surface is not sufficient to maintain overall minimum turbulence. The density stratification on the convex side of the airfoil surface has a negative Richardson number, which tends to induce a boundary layer separation and consequent gross increase in the turbulent energy dissipation in the duct. Accordingly, care must be taken not to process the gases on this unstable region, and to minimize the generation of turbulence for this source. Fortunately, the state of the turbomechanical art permits appropriate design, particularly when the provision of a clean laminar boundary layer for the centrifugal separation is a more important factor than conventional power conversion considerations.

Consideration of three-dimensional secondary flows is taken into account in the apparatus 10 of FIGS. 1-3. In this connection, the blade angles and contours may be made to vary with radial distance from the axis of rotation to account for the radial variation of rotor speed and the centrifugal effect to the radial motion due to the rotational velocity. Such design parameters and effects are well understood in the turbomachinery art, for example, through the use of free vortex flow in and out of a blade row, with radial equilibrium, and need not be further discussed in the present specification.

FIG. 1 shows the sealing of the rotor tip, where the centrifugal motion of the rotor provides for centrifugal pumping of heavier component gas which has been conducted through the porous blade surface into the hollow blade. Depending on the pressure at the porous surface of the blade, and the pressure drop across the porous surface, it may be necessary to restrict the flow, or to enhance the flow by suitable flow meters or pumps to obtain a desired effective suction velocity. In any event, the heavier gas component is channelled through the seal to outside of the casing of the turbomachine 10. The feeding stream can be supplied from the rotor axis as well as from the stator wall to the rotors and/or the stators, respectively. Substantial space may be provided between the rotor elements and the stator elements to mitigate the possibility of severe turbulent wakes downstream, and means for reducing turbulence may be located between the rotor and stator elements. For example, a honeycomb structure oriented along the direction of flow (which may be helical) may be provided between each rotor and stator element to produce a "clean" flow substantially free of major turbulence. In this connection, the turbulent energy $E_{turb}$ of the as mixture entering the separative blade rows should desirably be maintained at about 1% or less of the kinetic energy of the gas flow into the blade row.

As indicated, FIG. 3 is a schematic diagram of the apparatus 10 illustrating the over-all structure and operation of the apparatus. The apparatus 10 is adapted for cascaded processing through the use of a plurality of blade disk row separation units in order to cumulatively multiply the separative effect on each separation unit. In this connection, the turboseparative apparatus 10 of FIG. 1 comprises a plurality of alternatingly stacked rotor and stator elements which are arranged in pairs of a compressor section 302 and a turbine section 304. The compression and turbine sections share a single rotor axis 306, which is powered by a suitable turbine or electric motor 308. Each rotor and stator blade row forms an effective rotating seal with the casing or interior axis contact surface, respectively, to channel flow through the blade rows and to prevent unintended flow leakage between separation unit sections.

In the illustrated embodiment, a feed stock mixture of hydrogen and UF$_6$ is used which is 98 mole percent hydrogen and 2 mole percent UF$_6$, which has a sonic speed at ambient temperature (310° C.) of about 540 meters per second. The feed stream 309 is introduced at about atmospheric pressure at an intermediate compressor stage. The illustrated embodiment 10 has 17 compressor stages comprising a rotor stator pairs, and three turbine stages also each comprising a rotor stator pair. Each rotor and stator blade row element has 70 evenly distributed blades each with an average surface area of 5 centimeters by 15 centimeters (radial distance) of the concave surfaces, half of which surface is an aerodynamically smooth porous surface for conducting gas adjacent the surface to the interior of the blades. The blades generally have the structural component as described in FIG. 2, with appropriate shape, size and orientation modification for rotor, stator, compressor or turbine function in accordance with conventional turbomechanical design. The rotor element blade rows are mounted on a cylinder about 30 cm in radius, at the interior of the casings of the respective compressor and turbine sections, and have a total processing area of $10^5$ cm$^2$. As indicated, these are averaged dimensions with some stages being bigger and others being smaller to accommodate the changes of density in various stages. At one atmosphere input pressure, the sediment velocity of UF$_6$ is about 2 meters per second. For a free molecular flow, flow speed relative to the wall is far more important than the magnitude of the centrifugal force, and the average blade speed of the illustrated embodiment is 400 meters per second. The average radius of curvature of the blades at the porous surfaces is about 1.5 cm, and the temperature of operation is maintained on the average at about ambient conditions (T=310°K.) with the temperature increase produced by friction and increasing pressure at least partially compensated by cooling of the heavy waste stream in the respective flow control means 305 through appropriate heat exchange devices. The average suction rate of the heavy seed gases (e.g., UF$_6$) through the porous surface at each stage is controlled by the flow control means 305 for the respective stage to be in the range of from about 10 mole percent to about 50 mole percent of the axial flow rate of heavy seed gases to the blade unit. Because of the density stratification at the porous surface, it will be appreciated that the suction ratio as measured for the total gas mixture (e.g., an H$_2$-UF$_6$ mixture) will be less than the ratio as measured with respect to the heavy gas components. The indicated suction ratio range will provide a corresponding range of cut of separation of from about 0.9 to about 0.5 with respect to the heavy gas mixture.

It will be appreciated that the heavy fraction waste stream conducted through the porous blade surfaces will be depleted in $H_2$ lubricant gas, and hydrogen should best be added to the heavy fraction stream introduced to the first input stage of the compressor unit from a hydrogen source 311 to reach the desired operating concentration before reintroduction into the system, as indicated in FIG. 3. The hydrogen may be obtained, for example, by separation from the light gas fraction product stream at the downstream end of the apparatus 10 and the heavy gas fraction 315 at the upstream end of the apparatus. It may also be desirable to add (or withdraw) hydrogen to the system at intermediate stages to maximize the operation of the system, and provision is made for such addition as shown by the $H_2$ input arrows to means 305 in FIG. 3. In this connection, even though the $UF_6$ content of the waste stream taken away from each stage by suction may be balanced by the cascaded input from a succeeding stage, so the net concentration is maintained, it will be appreciated that conditions of operation (e.g., pressure, temperature) at each stage may be different, and may best use a slightly different light-heavy gas ratio.

The input product stream 309, at a predetermined, desired molar ratio of $UF_6$ and $H_2$, is introduced at an intermediate stage, so that the light and heavy fractions may be removed at the respective downstream and upstream ends. As shown in the drawing, the light product stream 313 is obtained from the downstream end of the axial flow of the system, while the heavy product stream 315 is obtained as the suction stream from the upstream end of the system. An increasing pressure and temperature gradient will exist in a downstream direction in the compressor section, and in an upstream direction in the turbine section, with a per/stage pressure ratio of less than 1.2. Axial flow rates may be maintained by hydrogen introduction to the upstream end of the apparatus, and/or by control of rotor cross sectional areas. The density of uranium in the form of $UF_6$ passing through the porous surface at one-half mole fraction at one atmosphere is about 4.68 milligram per $cm^3$ in the illustrated embodiment. The separative factor $\theta$ is maintained at one-half useful separative work $\sigma U$ at one Million SWU per year in a relatively small machine. The control of subsonic flow in turbomachinery is a well developed technical art. Because the materials and design complications of combustion and high temperatures are not present, and because suction and blowing may be utilized to stabilize the system, the design is relatively simple in respect of conventional turbomechanical aspects design considerations.

Although the illustrated embodiment desirably may be operated at an effective separative factor $\theta$ of 0.5 (in terms of $UF_6$ components only, apparatus and methods in accordance with the invention may be operated with other effective separative factors, for example, by varying the amount of gas conducted through the porous blade surfaces. The most efficient utilization of separative factors other than 0.5 in cascade processing requires that the input material at any particular stage approximate the isotope composition of the gas being processed in that stage. Thus, the heavier porous suction product gas from a particular blade row should not necessarily be used as an input stream for the preceeding blade row, but rather should best be conducted to a stage having an equilibrium processing isotropic composition which is substantially the same as the composition of the suction product stream to be used as an input stream.

The appropriate cascading connection arrangements may generally be discussed as follows: Let "a" and "b" be the mole-percent composition of $U^{235}F_6$ in the gas $UF_6$ in the waste and in the head streams respectively, and let H and W be the respective flow rates of the head and the waste streams in moles per second respectively, for a given stage the throughput L equals the sum of H and W (L=H+W) and the cut of separation $\theta$ equals H divided by L ($\theta$=H/L). For a centrifuge in equilibrium, or for a separative process not in equilibrium, the separative constant $\alpha$ may be represented as follows:

$$\alpha = \frac{b/(1-b)}{a/(1-a)} = \frac{b(1-a)}{a(1-b)} = 1 + \psi$$

The separative factor $\psi$ thus may be represented as $\psi=(b-a)/(a(1-b))$, and the mole percent composition of $U^{235}F_6$ may be represented as:

$$a=b/(1+\psi-b\psi)\simeq b/(1+\psi)=b/\alpha$$

The processing stages may be represented by a series of separative stages such as shown in FIG. 3, in which c represents the mole percent of $U^{235}F_6$, in the head stream of the processing stage for which a suction product inout stream from a succeeding stage is desired. To find the number n that will match the concentration b in W and H, the concentration c may be determined from the relation:

$$W(b-a)=H(b-c),$$

that is, $$c = b - (b-a)W/H = b\frac{\theta+2\theta\psi-\psi-2b\theta\psi}{\theta(1+\psi-b\psi)} \simeq b\frac{\theta+2\theta\psi-\psi}{\alpha\theta}$$

Therefore, to balance the concentration, we need:

$$Wb/Wa=(Hb/Hc)^n,$$

or, $$\alpha=(\alpha\theta/(\theta+2\theta\psi-\psi))^n,$$

that is, $$n=\ln\alpha/\{\ln\theta\alpha-\ln(\theta+2\theta\psi-\psi)\}$$

In the illustrated embodiment of FIG. 3, cascading connections for a separative factor of 0.5 is shown. For a separative factor $\theta$ of 0.5, it will be seen that n=1, which indicates that the heavy waste stream from one stage should be used as a feed stream for the immediately adjacent upstream stage. However, for separative factors higher than 0.5, the intervening number of stages will be increased. The number of stages n for separative factors higher than 0.5 is relatively insensitive to the value of $\psi$ or $\alpha$.

The diffusion coefficient $D_{12}$ is inversely proportional to pressure, and a reduced pressure with higher sediment velocity may be utilized to produce the same higher molecular weight flux passing through the porous surface. However, a reduced pressure will change the ratio between the waste and the head streams, bringing the cut of separation $\theta$ closer to the value $\frac{1}{2}$. As indicated in Equation (2), $\theta$ should best be close to $\frac{1}{2}$ in order to give an optimal useful-separative work $\delta U$, and the operational pressure and the effective suction velocity may be utilized as variable to achieve optimization in this regard.

It will be appreciated that the present invention provides improved methods and apparatus for mechanical separation of gases such as uranium isotope mixtures.

While the present invention has been particularly described with respect to certain specific embodiments, it will be appreciated that various modifications and adaptations to different type of turbomachinery methods and apparatus may be made without departing from the spirit and scope of the present disclosure. Furthermore, separative effects may be modified or adapted through use of various aerodynamic techniques, such as by introducing one or more laminar boundary layers of low molecular weight lubricant gas (as by blowing from a slot or by use of a hydrodynamically smooth porous surface supplied with hydrogen pressure internally of the blade), and providing a porous suction layer downstream of the region of lubricant gas introduction to preferentially collect the heavier gas element, which will pass through the laminar lubricant boundary layer first because of its higher sedimentation velocity. Furthermore, such laminar lubricant gas layers beneficially may be introduced at a temperature which is lower than that of the gas being processed, and may be introduced at an effective input velocity orthogonal to the surface which will preferentially transfer an accelerative component away from the surface to the lighter components of the mixture to be separated. Such modifications and adaptations are intended to be included within the scope of the invention as defined in the following claims.

Various of the features of the invention are set forth in the following claims.

What is claimed is:

1. A turbomechanical method for separating a gas mixture of different molecular weight components, on the basis of molecular weight of the components of the mixture, comprising the steps of introducing the gas mixture into a separation zone, rotatably forcing a plurality of curved-surface blades into the gas mixture in the separation zone to accelerate the gas laterally of the direction of motion of the blades under non-turbulent flow conditions, said acceleration being along the axis of rotation of the blades, and to produce a density gradient in the laterally accelerated gas adjacent the curved surfaces of the blades forced into the gas mixture, and separating a higher molecular weight fraction of said laterally accelerated gas immediately adjacent the curved surfaces of said blades to provide higher and lower molecular weight gas fractions by diverting said higher molecular weight gas fraction immediately adjacent the surfaces of said blades to the respective interiors of said blades through smooth, porous zones of said curved blade surfaces.

* * * * *